United States Patent
Higgs

[15] 3,652,103
[45] Mar. 28, 1972

[54] AUTOMATIC BRAKE FOR A SHOPPING CART

[72] Inventor: Stuart P. Higgs, 12533 Emelita St., North Hollywood, Calif. 91607

[22] Filed: Mar. 23, 1970

[21] Appl. No.: 21,776

[52] U.S. Cl. ...................... 280/33.99 C, 58/152 R, 70/226, 70/271, 188/19, 188/31, 188/163, 340/280
[51] Int. Cl. ........................................................ B62b 5/04
[58] Field of Search ................ 280/33.99; 70/268, 269, 267, 70/226, 225, 271, 283; 340/280, 416, 224, 282; 180/114; 188/31, 19, 29, 163; 58/39.5, 152 R, 152 O

[56] References Cited

UNITED STATES PATENTS

| | | | |
|---|---|---|---|
| 2,958,537 | 11/1960 | Young | 280/33.99 C |
| 2,679,302 | 5/1954 | Watson et al. | 188/31 |
| 3,029,905 | 4/1962 | Nowak | 280/33.99 C UX |
| 2,937,706 | 5/1960 | Chandler | 180/19 H |
| 2,964,140 | 12/1960 | Berezny | 280/33.99 C X |
| 3,002,370 | 10/1961 | La Brie, Jr. | 280/33.99 C X |
| 3,031,037 | 4/1962 | Stollman | 280/33.99 C UX |
| 3,394,945 | 7/1968 | Steier et al. | 280/33.99 C |
| 3,201,139 | 8/1965 | Turlington | 280/33.99 C |
| 3,331,200 | 7/1967 | Byron et al. | 58/39.5 X |

FOREIGN PATENTS OR APPLICATIONS

| | | | |
|---|---|---|---|
| 472,025 | 2/1929 | Germany | 180/114 |

Primary Examiner—Benjamin Hersh
Assistant Examiner—Milton L. Smith
Attorney—Nilsson, Robbins, Wills & Berliner

[57] ABSTRACT

For a shopping cart having a frame mounted on roll-about wheels, an automatic lock which is released by a timing mechanism a predetermined period of time after actuation. A photoelectric cell is operatively associated with the timing mechanism so that a beam of light, e.g., at a store exit can actuate the mechanism. A rechargeable battery is included and male and female electrical connectors are disposed in opposite forward and rearward directions on the cart for mating engagement with counterpart connectors on other like-constructed carts stacked therewith, whereby recharging of the batteries of each stacked cart can be simultaneously accomplished from a single source of electrical power.

8 Claims, 5 Drawing Figures

PATENTED MAR 28 1972 3,652,103
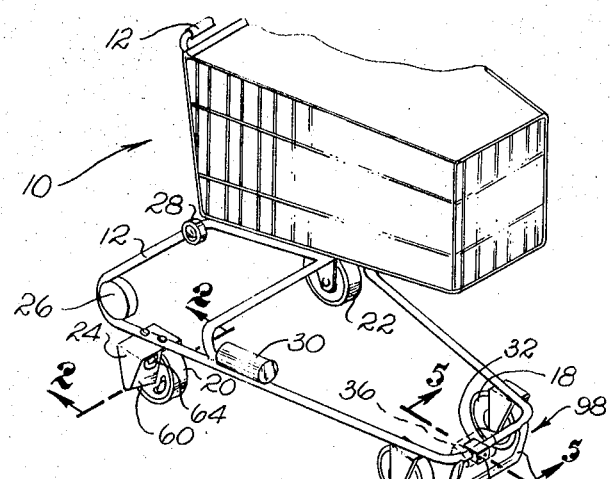
Fig. 1.
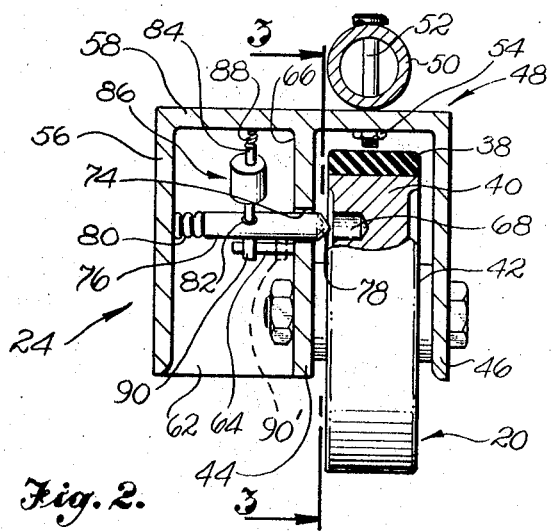
Fig. 2.
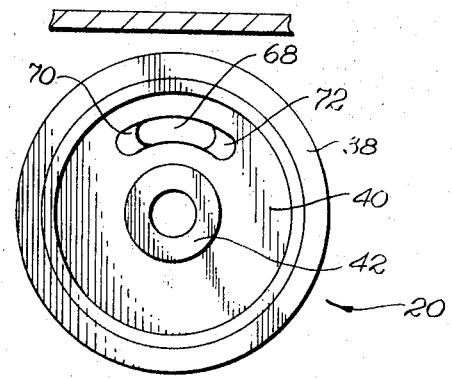
Fig. 3.
Fig. 4.
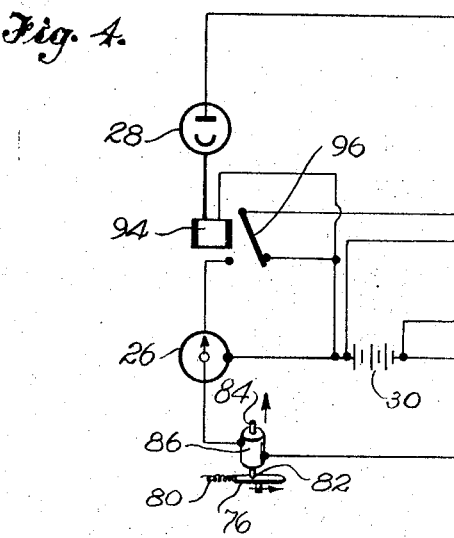
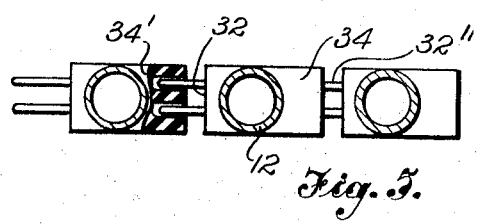
Fig. 5.
INVENTOR.
STUART P. HIGGS
BY
Nilsson, Robbins, Wills & Berliner
Attorneys

AUTOMATIC BRAKE FOR A SHOPPING CART

FIELD OF THE INVENTION

The fields of art to which the invention pertains include the fields of automatic vehicle trips, wheeled vehicles of the nesting type, and automatic locking devices.

BACKGROUND AND SUMMARY OF THE INVENTION

In the modern supermarket and in other retail establishments, shopping carts are provided for use by the customers while selecting merchandise and so that the customer can conveniently carry the merchandise past the checkout counter and to his automobile, generally parked on an adjacent parking lot. However, a number of customers may live within walking distance to the market and such customers may wheel the cart to their homes with the result that the carts are often not returned to the market. In order to minimize or eliminate such losses, some markets have resorted to the placement of barricades around the exit areas from the parking lot in the form of vertical posts having a spacing which is less than that of the shopping cart but which allows a customer to carry material through in his arms. Such barricades are generally unsightly and have the effect of limiting open access to the parking lot with resultant traffic bottlenecks during peak shopping times. Other devices have been suggested which involve the use of locking mechanisms for a wheel or axle of the shopping cart. For example, in U.S. Pat. Nos. 2,964,140, and 3,031,037, devices are disclosed which rely on magnetic components embedded in the concrete of the parking lot to trip a locking mechanism. Such devices require a delicate balancing of components for effective operation and do not respond uniformly at all speeds of rotation. Other devices are exemplified by U.S. Pat. Nos. 3,002,370, and 3,394,945, wherein a spring mechanism is wound tightly by movement of the cart a predetermined distance so as to bind a wheel of the cart. With such mechanism, the cart becomes less free-rolling as one progresses toward a farther point in the parking lot. Accordingly, those who park furthest from the store exit find that their cart becomes progressively more difficult to push as they approach their car, resulting in customer annoyance with the cart. Furthermore, such mechanisms are generally very expensive and add greatly to the cost of the cart.

The present invention provides an automatic lock for a shopping cart which allows the cart to be wheeled in free-rolling fashion up until the moment of locking of the cart. This is accomplished by providing a locking mechanism which is actuated only after a predetermined period of time has passed after the customer leaves the store. This time period is determined as the period normally required for a customer to reach the most distant point in the market's parking lot with additional contingency time for momentary delays.

The automatic lock comprises rotation-limiting means for at least one of the wheels of the cart, timing means operable when actuated to effect locking of the rotation-limiting means after a predetermined period of time, and means for actuating the timing means. In a particular embodiment, a rigid locking bar is spring loaded in a release position adjacent a recess therefore in one of the cart wheels. A solenoid is operatively associated with the locking bar to trip the bar when actuated whereby to lock the wheel against forward and rearward movement. The solenoid is actuated by a timing mechanism which, in turn, is actuated by means of energization of a photoelectric cell carried on the cart. A light source for the photoelectric cell is disposed exteriorly of the cart at an exit position in the door so that when the cart is pushed out of the exit, the timing mechanism is actuated to start the predetermined period of time.

In a further embodiment, a rechargeable battery source of power is provided for operation of the lock. In this regard, the cart is formed to be stackable with other like-constructed carts and male and female connectors are disposed on each cart in opposite forward and rearward directions for mating engagement with counterpart connectors on adjacent carts. By such means the batteries of each cart may be recharged simultaneously from a single source of electrical power.

DESCRIPTION OF THE DRAWINGS

FIG. 1 is a front-side perspective view of a shopping cart schematically showing components constituting the automatic lock of this invention;

FIG. 2 is a cross-sectional view taken substantially along the line 2—2 of FIG. 1, in the direction of the arrows;

FIG. 3 is a vertical plan view of a wheel adapted for utilization with a lock of this invention, taken on the line 3—3 of FIG. 2, in the direction of the arrows;

FIG. 4 is a schematic representation of an electrical circuit which can be utilized in operation of the present invention;

FIG. 5 is a schematic depiction of a plurality of stacked connectors which may be utilized in the present invention.

DETAILED DESCRIPTION

As required, a detailed illustrative embodiment of the invention is disclosed herein. However, it is to be understood that this embodiment merely exemplifies the invention which may take many different forms that are radically different from the specific illustrative embodiment disclosed. Therefore, specific structural and functional details disclosed herein are not to be interpreted as limiting, but merely as a basis for the claims which define the scope of the invention.

Referring to FIG. 1, a conventional shopping cart 10 is illustrated which has been fitted with components constituting an automatic lock of this invention. The cart 10 includes a tubular metal frame 12 on which is mounted a large wire basket 14 carrying a handle 12 rearwardly thereof in the usual fashion. Two pairs of wheels are attached to the lower periphery of the frame 12, a forward pair of wheels 16 and 18 which are swiveledly mounted on the frame 12 and a rearward pair 20 and 22 which are fixed in stationary fashion to the frame 12 so that they cannot swivel.

The automatic lock of this invention is constituted by a number of components variously located on the cart frame 12, including a locking bar mechanism enclosed within a housing 24, a timing mechanism indicated schematically at 26, a photoelectric cell indicated schematically at 28, a battery power source indicated schematically at 30, and male and female electrical connectors 32 and 34 respectively, enclosed by a housing indicated by dashed lines 36. Each of the foregoing components cooperate to accomplish automatic timed locking of the cart 10 as hereinafter detailed.

Initially, the cart 10 is free-wheeling in that each of the wheels 16, 18, 20 and 22 are independently rotatable without restriction. However, one of the wheels has associated therewith a locking mechanism which when actuated prevents its rotation. This wheel is advantageously chosen as a rear wheel, such as the wheel designated by the numeral 20, so that it is locked against rotation during travel of the cart 10, the cart is not caused to abruptly stop but is merely cause to pivot about the wheel 20 by means of the swiveling front wheels 15 and 18.

Referring to FIG. 2, the manner of construction of the wheel 20 and the locking mechanism therefore is illustrated. The wheel 20 comprises a rim 38 of molded rubber supported circumferentially about a hub 40 centrally journaled on a bearing 42 for effecting rotation of the wheel 20. The bearing 42 is journaled between the arms 44 and 46 of a clevis which is secured to the underside of a horizontal tubing member 50 of the frame 12 by means of a headed bolt 52 and nut 54 as shown.

The clevis 48 is formed along an outer side with an L-shaped member constituting the side and top walls 56 and 58 respectively of the locking bar housing 24. Referring additionally back to FIG. 1, the housing 24 also includes front and rear walls 60 and 62 respectively, the front wall 60 defining a horizontally elongate slot 64 (indicated by dashed lines in FIG. 2) for purposes hereinafter described.

Referring additionally to FIG. 3, the outer surface 66 of the wheel hub 40 is dished out to define a curved, somewhat elongate pocket 68 having lead-in edges 72 sharply defined therefrom. The outer clevis arm 44 defines an opening 74 which is shaped and positioned so as to coincide with the pocket 68 when the wheel 20 is rotated so that the pocket 68 is at its uppermost rotational position. A rigid lock bar 76 is provided with a lead end 78 thereof slidably within the clevis arm opening 74 and the other end secured by means of a spring 80 to the inner surface of the housing sidewall 56. The lock bar 76 defines a cylindrical pocket 82 which is positioned through the surface of the lock bar 76 so that when the lock bar 76 is pushed rearwardly against the spring 80, the pocket 82 coincides with the movable core 84 of a solenoid shown schematically at 86. The solenoid 86 is rigidly secured within the housing 24 by means not shown.

In accordance with the foregoing arrangement, the lock bar 76 is spring loaded against the side housing wall 56 by movement rearwardly thereof until the solenoid core 84 engages the pocket 82. The solenoid core 84 is spring loaded as indicated schematically at 88 so that upon encountering the pocket 82 the core seats itself in the pocket 82 lug latching the lock bar 76 in a spring loaded position. A lug 90 is formed depending from the lock bar 76 to facilitate such spring loading. The lug 90 is horizontally positioned on the lock bar 76 so that when the lock bar 76 is an extreme rightward position, there is a small space defined between the lug 90 and the outer clevis arm 44 (as illustrated by the dashed lines 90 prime showing the lug in its extreme rightward position). This spacing is sufficient to enable the insertion of a tool such as a thin rod between the leg 90 and outer clevis arm 44 to facilitate spring loading of the lock bar 76. It is for this purpose that the front housing wall 60 defines the horizontally longate slot 64 previously referred to. Thus, one can spring load the lock bar 76 by incision of an appropriate tool through the front housing wall slot 64. The tool may be appropriately keyed to an odd shaped slot 64 to prevent unauthorized release.

Referring now to FIG. 4 in conjunction with FIG. 1, there is schematically illustrated an electrical circuit for the automatic operation of the locking mechanism of this invention. For purposes of explanation, it is assumed that initially the locking bar 76 has been spring loaded and secured in a latched position by means of inserting of the solenoid core 84 into the locking bar pocket 82, thus allowing the cart 10 to be free wheeling. Upon leaving the premises, a beam of light of appropriate intensity and/or wave length, as known to the art, is applied to the photoelectric cell 28. This may be accomplished by locating the beam of light at a proper elevational position on an exit door jam, or such a beam of light may be shined manually on the auto-electric cell 28 by an employee of the store at the checkout stand. The photoelectric cell 28 is electrically connected on one side by wiring through the tubular cart frame 12 to one terminal of the battery 30, and on the other side to a latching relay 94 (not shown in FIG. 1) which, in turn, is connected to the opposite terminal of the battery 30. When actuated by the externally applied light beam, the photoelectric cell 28 causes current to be applied through the relay 94 effecting closure of a switch 96 to actuate the timing mechanism 26. The timing mechanism 26 is illustrated schematically and can be constructed in accordance with any of the known prior electric timing mechanisms. The timing mechanism 26 is preset so that following a predetermined period of time after actuation, an electrical circuit is closed for actuation of the solenoid 86. Actuation of the solenoid 86 effects a withdrawal of the solenoid core 84 from the lock bar pocket 82, thereby tripping the lock bar 76. The lock bar 76 is then projected by the force of the spring 80 through the clevis arm opening 86 and into the hub pocket 68 to lock the wheel 20 in place, thereby preventing further movement of the cart 10.

Referring particularly to FIG. 1, there is illustrated an antitilt mechanism to prevent the shopper from tilting the cart so as to remove the rear wheel 20 from contact with the ground. For this purpose, a U-shaped tubular member 98 is fixed to the frame 12 at a location forward of and adjacent to the front wheels 16 and 18. The U-shaped member include a central reach 100 which is horizontal and extends transversely of the cart 10 and which is only slightly above ground level. The reach 100 is held in its position by a pair of dependent arms 102 and 104. Accordingly, if the cart 10 is tilted so that a shopper tries to roll it on its front two wheels 16 and 18, the reach 100 will contact the ground and prevent the rolling of the cart in such tilted position. A similar device can be installed sideways of and adjacent to the rear wheel 22 to prevent tiling in that direction, although this feature is not shown in the drawing. Such antitilt mechanisms do not constitute novel parts of this invention but are described merely for purposes of completion.

Referring again to FIG. 1 in conjunction with FIG. 4, there is provided on a forward turn of the tubular frame 12 a connector housing 36 which encloses a male electrical connector 32 and a female electrical connector 34. The male and female connectors are disposed on opposite rearward and forward directions, respectively, of the frame 12 and constitute part of a mechanism for recharging the battery 30. Shopping cart such as illustrated herein are typically constructed so as to nest one within another whereby storage of a line of such carts is readily accommodated. The connectors 32 and 34 are disposed so that when like-constructed carts are nested in front of and in back of the illustrated cart 10, counterpart connectors on such like-constructed carts are pushed into mating engagement with the connectors 32 and 34. This is illustrated in FIG. 5 wherein the connectors 32 and 34, disposed on opposite sides of the tubular frame 12 are shown in matingly engagement with counterpart connectors. Thus, the male connector 32 of the cart 10 is illustrated in engagement with a counterpart female connector 34' of a cart nested rearwardly thereof. Similarly, the female connector 34 of the cart 10 is shown matingly engaged with a male connector 32'' of a part nested forwardly thereof.

The purpose of the foregoing arrangement is to enable the batteries 30 of each of a plurality of nested carts to be recharged simultaneously. Referring now additionally back to FIG. 4, the male connector 32 is connected to a source of alternating current, such as ordinary house current which is fed into a charger 106 electrically connected to opposite terminals of the battery 30. The alternating current can be applied to the male connector 32 directly or by means of its connection with a female counterpart connector such as 34' illustrated in FIG. 5. In this regard, the female connector 34 is electrically connected in parallel with the male connector 32 so that a counterpart male connector 32'' of forwardly nested cart can be plugged therein to receive charging current simultaneously with the male connector 32. By such means, the batteries of each cart in a stacked nest of carts can be recharged simultaneously.

By means of the foregoing construction, shopping carts 10 are provided which can be free wheeled in the marketing area of the store and which upon leaving the store are actuated so that after a predetermined period of time, e.g., 5 minutes, one wheel of the cart is locked against further rotation, thereby preventing removal of the cart from the vicinity of the shopping area. The locking bar 76 can thereafter be reset by an employee having an appropriate tool therefore, as described hereinabove.

I claim:

1. An automatic brake for a shopping cart having a frame mounted on roll-about wheels, said brake comprising:
    rotation-impeding means for at least one of said wheels allowing free rotation of said wheel when in a released position and impeding rotation thereof when in a brake position, said rotation-impeding means comprising a rigid member adjacent the side of said one wheel and spring loaded in said release position, said rigid member being formed to engage said one wheel side when in a brake position, and a solenoid mechanically connected to said rigid member to retain said rigid member in said release position and separable therefrom when actuated to permit said rigid member to move under the force of said spring to said brake position;

timing means;

said solenoid being actuated by said timing means after a predetermined period of time to separate from said rigid member whereby said rigid member engages said one wheel to brake said cart; and means for actuating said timing means.

2. An automatic brake for a shopping cart having a frame mounted on roll-about wheels, said brake comprising:

rotation-impeding means for at least one of said wheels allowing free rotation of said wheel in a released position and impeding rotation thereof when in a brake position;

timing means;

means actuated by said timing means to actuate said rotation-impeding means to effect braking by said rotation-impeding means after a predetermined period of time; and means for actuating said timing means comprising electrical circuitry, a photoelectric cell responsive to a light beam of predetermined intensity and/or wave length, means actuated by said photoelectric cell to actuate said timing means, and a light source exteriorly of said cart for providing said light beam.

3. The invention according to claim 1 in which said rotation-impeding means is formed to lock said wheel against forward rotation.

4. The invention according to claim 1 in which said timing means comprises an electrically driven timing mechanism, said cart carrying a source of power for said mechanism.

5. The invention according to claim 1 in which said means for actuating said timing means comprises an electrically operable mechanism, said cart carrying a source of power for said mechanism.

6. The invention according to claim 1 including a battery source of power and means for recharging said battery.

7. An automatic brake for a shopping cart having a frame mounted on roll-about wheels, said brake comprising:

rotation-impeding means for at least one of said wheels allowing free rotation of said wheel when in a released position and impeding rotation thereof when in a brake position;

timing means operable when actuated to effect locking of said rotation-impeding means after a predetermined period of time;

means for actuating said timing means;

at least one of said means being an electrically actuated means;

a battery source of power for said electrically actuated means; and means for recharging said battery;

said cart being formed to be stackable with other like-constructed carts and said recharging means comprising male and female connectors disposed on said cart in opposite forward and rearward directions for mating engagement with counterpart connectors on other like-constructed carts stacked therewith whereby the rechargeable batteries of said stacked carts may be recharged simultaneously from a single source of electrical power.

8. An automatic brake for a shopping cart having a frame mounted on roll-about wheels, said brake comprising:

electrically actuated means for impeding rotation of at least one of said wheels;

a battery source of power;

means for recharging said battery; and means for electrically connecting said electrically actuated means to said battery to draw power therefrom;

said cart being formed to be stackable with other like-constructed carts and said recharging means comprising male and female connectors disposed on said cart in opposite forward and rearward directions for mating engagement with counterpart connectors on other like-constructed carts stacked therewith whereby the rechargeable batteries of said stacked carts may be recharged simultaneously from a single source of electrical power.

* * * * *